May 1, 1956     TAKERU HIGUCHI     2,743,818

CONTINUOUS PARTITION CHROMATOGRAPHY

Filed Sept. 6, 1951     3 Sheets-Sheet 1

*INVENTOR.*
TAKERU HIGUCHI
BY
ATTORNEY

INVENTOR.
TAKERU HIGUCHI
BY
ATTORNEY

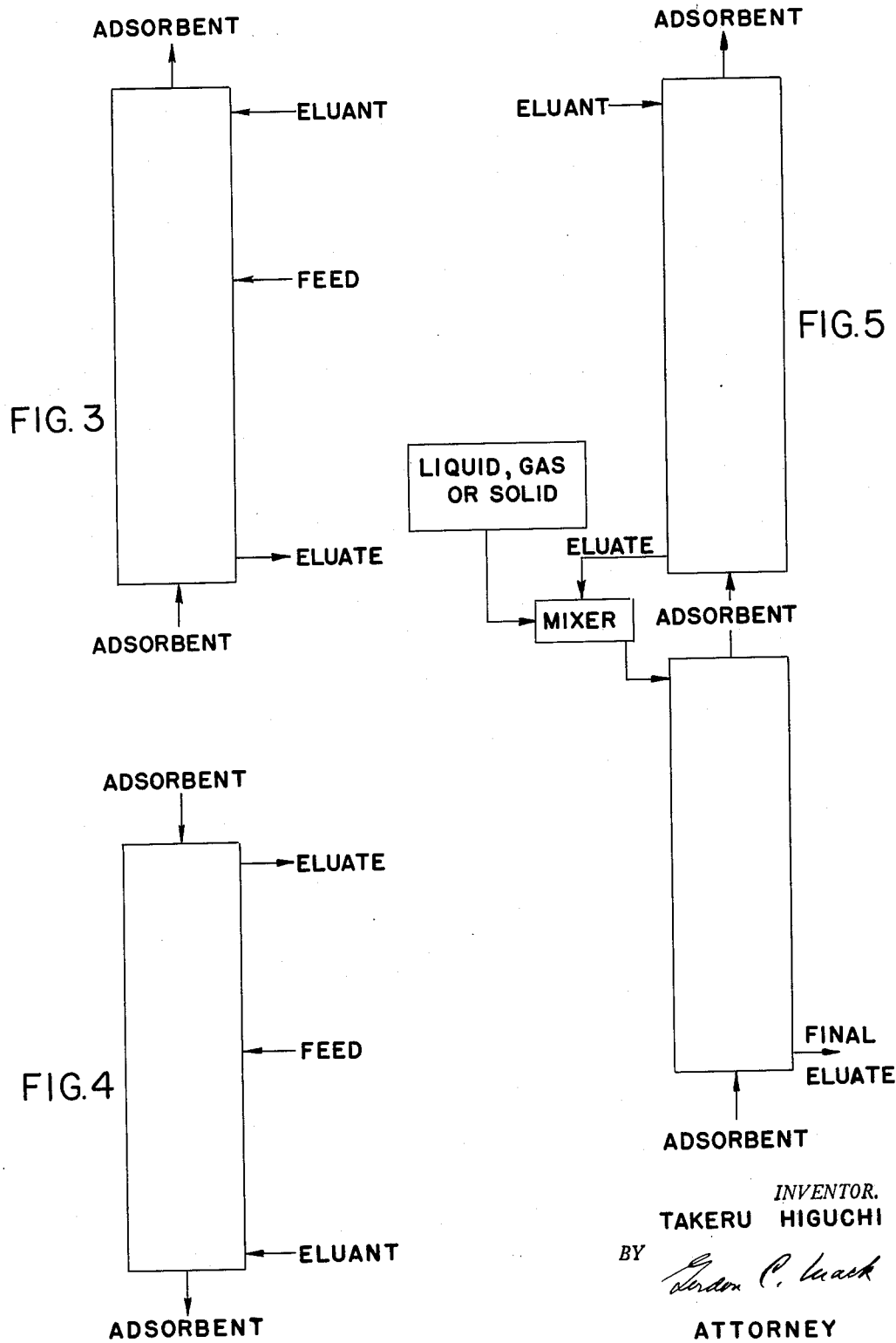

United States Patent Office 2,743,818
Patented May 1, 1956

2,743,818

CONTINUOUS PARTITION CHROMATOGRAPHY

Takeru Higuchi, Madison, Wis., assignor to The C. P. Hall Company of Illinois, Chicago, Ill., a corporation of Ohio Application September 6, 1951, Serial No. 245,407

3 Claims. (Cl. 210—42.5)

This invention relates to the continuous separation of two materials by utilization of their partition characteristics, using two immiscible solvents and an adsorbent to which one of the solvents adheres. One of the solvents is more highly polar than the other, and ordinarily will be aqueous.

DEFINITIONS

The "aqueous phase" of the system refers to the aqueous solution. Ordinarily this is adsorbed on the adsorbent.

The "organic phase" is the non-aqueous or less polar phase of the system, and is ordinarily the external phase. It may be the internal phase adhered to the adsorbent.

"Partition coefficient" is $$\frac{\text{concentration in aqueous phase}}{\text{concentration in organic phase}}$$

when the two phases are in equilibrium.

"Development" refers to the process of increasing separation achieved by differential elution of the materials being separated.

THE PROCESS

In the process the two solvents move countercurrent to one another. One of the solvents adheres to the adsorbent and moves with it. The materials to be separated are generally introduced into the system in solution in a solvent immiscible with the solvent adhering to the adsorbent, and miscible with the other solvent. Alternatively the materials may be dissolved in the external phase at some point between the two ends of the system.

Usually the adsorbent will be hydrophilic and the aqueous phase will adhere to it. The materials will then be introduced in solution in an organic solvent which will go to make up the organic phase. Such a system will be referred to more particularly in what follows.

The two materials dissolved in the feed solution are referred to herein as solutes. By selection of the solvents the partition coefficients of the two solutes in the system is such that one solute prefers one phase and the other solute prefers the other phase. Thus one solute is withdrawn from the system dissolved in the organic phase which contains little or none of the other solute, and said other solute is withdrawn from the system in the aqueous phase which adheres to the adsorbent. The aqueous phase finally withdrawn from the system contains little or none of the first mentioned solute. The rate of countercurrent flow of the adsorbent and organic phase is regulated so that the organic phase, when removed as eluate, is entirely or substantially free from one of the solutes, and that solvent is removed in solution in the aqueous phase adhering to the adsorbent entirely or substantially free from the solute removed in the eluate.

The transfer of the one solute from the organic phase to the aqueous phase occurs at the interface between the two phases. The area of the interface is exceedingly large when the aqueous phase is adsorbed on the adsorbent. It is equivalent to a tower with hundreds or thousands of single-stage extractions. Throughout the process the particles of the bed should retain their relative positions insofar as this is practical.

The rate of countercurrent movement of the adsorbent and organic phase required to effect the desired separation will depend upon the nature of the adsorbent, the composition of the two phases, and the difference in the partition coefficients of the two solutes between the respective phases. It will also be effected by the temperature of the system. In commercial operations it will ordinarily be desirable to operate at an elevated temperature, because of the increase in solubility of solids as the temperature is raised which makes it possible to treat a greater amount of material in any particular apparatus.

The solutes may be gaseous, liquid, or solid. The process is particularly adapted to the separation of materials which are not readily separated by other means. Thus, it would never be used commercially for separating materials which are in a different physical state, and thus one would never use the process to separate a solid from a gas. Substances which have too high a boiling point to be distilled economically or decompose on heating, liquids having relatively close boiling points and crystalline materials having similar solubilities, etc. will most commonly be separated by this process. The process can be used to advantage in the separation of a material appearing only in minute concentration, as for example radio-active substances, anti-biotics, etc.

The adsorbent must be a solid. It may be a wick-like material such as filter paper, cloth, or the like, but will usually be in the form of particles, for example, silicic acid, kieselguhr, hydrated calcium silicate, alpha cellulose etc. for systems in which a hydrophilic adsorbent is required and to which the aqueous phase adheres. For hydrophobic adsorbents powdered quartz etc. will be employed, or other adsorbent to which the organic phase adheres. Ordinarily the bed of adsorbent material will move vertically, either up or down.

The aqueous phase may contain salts or other substances which affect its polarity, solvent properties or hydrogen ion concentration, etc., depending upon the solutes which are to be treated in the system. Substances commonly added to the aqueous phase include, in addition to salts, the various alcohols, acids, etc.

The organic phase will ordinarily be relatively non-polar and composed of such water-immiscible solvents as the aliphatic hydrocarbons, benzene, chlorinated hydrocarbons (both aliphatic and aromatic), etc., as for example gasoline, heptane, octane, nonane, monochlorobenzene, the dichloro benzenes, chloroform, carbon tetrachloride, trichloropropane, etc. The polarity of the organic phase may be regulated by adding relatively polar solvents to non-polar solvents in any desired amount. Where the aqueous phase contains a high concentration of such salts as sodium carbonate, etc., a relatively more polar organic solvent may be employed as the organic phase. On the other hand, if the aqueous phase is rendered relatively non-polar, as for example by addition of lower alcohols, it is necessary to employ extremely non-polar organic solvent as the other phase.

Many different types of equipment may be employed for carrying out the process. In the laboratory a continuous highly cellulosic material, such as a string may be used as the adsorbent material. In commercial operations a bed composed of packed fine particles will usually be preferred. Although the bed may be moved downwardly with the organic phase flowing countercurrently upward, it will usually be desirable to move the bed upwardly and have the organic phase move down through it.

To move the bed of adsorbent upwardly in a restraining column of metal, plastic, etc. various mechanical means may be employed. Scoops or buckets attached to chains or the like and pivoted to dump the adsorbent when they reach the top of the equipment will be satisfactory. Such scoops or buckets will have porous bottoms which may, for example, be made of filter cloth held by one or two plies of wire mesh. Alternatively, the means for lifting the adsorbent bed may be in the nature of paddles of filter cloth construction suitably supported, which will be pivoted so that after moving upwardly through a column they may be swung over and brought down on a continuous chain. Such paddles can be pivoted at any angle without interfering with one another.

Alternatively, the bed may be enclosed in sheet-like material which is brought together to form a column and then raised and then spread at the top to release the adsorbent material. Such material may be of the nature of an enlarged hose which is slit longitudinally. It will fold around the adsorbent material at the bottom of the column, lift it and then with or without changing its direction it will be opened to release the adsorbent. The hose-like material may be of a mesh suitably covered, or other means may be employed.

In a tube in which the walls are sufficiently frictionless the bed may be moved upwardly merely by suitable pressure from the bottom. This pressure may be supplied by the constant addition of fresh adsorbent material, either continuously or in very small increments.

The effectiveness of the separation depends to a large extent upon the homogeneity of the adsorbent bed. Where a homogeneous bed is not possible because of mechanical difficulties a taller column is necessary to make the necessary separation.

The invention will be further described in connection with the accompanying drawings.

Figs. 3, 4 and 5 illustrate diagrammatically means for carrying out the invention with particulate adsorbent.

*Example*

Figure 1:
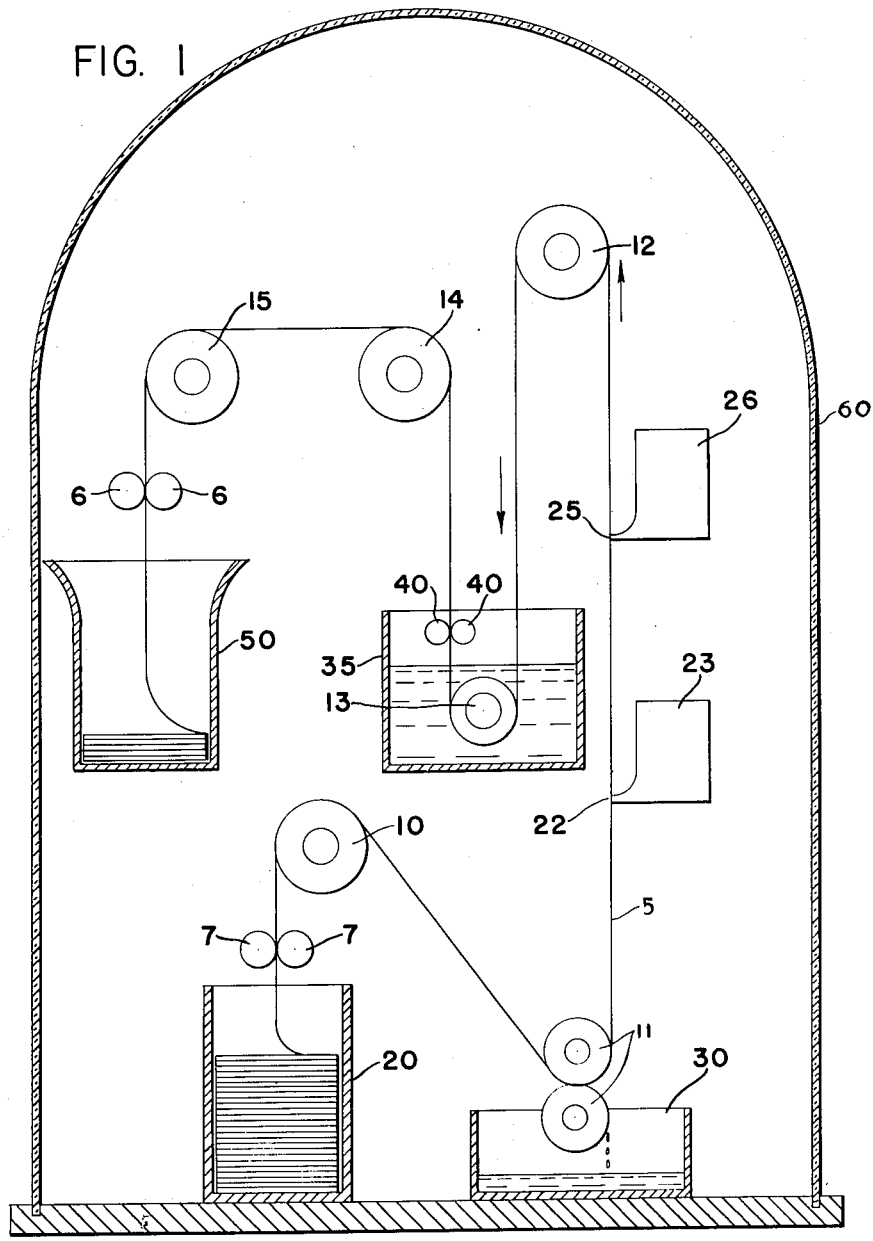
Fig. 1 illustrates means for carrying out the process with wick-like adsorbent.

In this example reference will be had to separating pimelic and glutaric acids. In Fig. 1 the adsorbent may be a cotton string 5. The driven pinch rolls 6 pull it through the system, and the pinch rolls 7 act as a brake to hold the string sufficiently taut to cause it to move in a straight line from pulley 10 through the pinch rolls 11, and thence to the several pulleys 12, 13, 14, 15.

The string is loosely coiled in the supply container 20. As it moves upwardly from the pinch rolls 11 it is first supplied through the small opening 22 in container 23 with feed solution which contains one-half of one per cent of each of the two acids in 95 per cent chloroform and 5 per cent tertiary-amyl alcohol. It is then supplied with eluant from the small opening 25 in container 26. The eluant is 97 per cent chloroform and 3 per cent tertiary-amyl alcohol.

The string in the container has 20 to 30 per cent by weight of moisture adhering to it. This moisture is sufficient to serve as the aqueous phase. The string is of cotton and the moisture adhering to the fuzz has a tremendous surface area. The eluant is supplied from the container 26 at a sufficient rate to overcome the very slow upward movement of the string, so that the eluant travels down the string and organic phase drips into the container 30 as it is squeezed from the string by the pinch rolls 11.

The feed solution containing the two acids is supplied slowly from container 23. Glutaric acid is more polar than pimelic and prefers the moisture on the string whereas the sebacic acid prefers the eluant. The string moves upward at such a rate that the concentration of glutaric acid in the moisture adhering to the string is increasingly greater, immediately above the outlet 22. Although there is some glutaric acid in the organic phase as it flows below the outlet 22, this is transferred to the aqueous phase, and immediately above the pinch rolls 11 there is pimelic acid, but no glutaric acid in the organic phase. Thus the organic phase squeezed from the string by pinch rolls 11 contains pimelic acid and no glutaric acid. This is collected in the container 30 and treated for separation of the acid in any desired manner. The whole is covered with a bell jar 60 to prevent loss of solvent and maintain the humidity and moisture on the string constant.

The glutaric acid rises with the string, dissolved in the aqueous phase. The container 35 contains a polar solvent such as ethyl alcohol, etc. This washes the glutaric acid from the string. The string is squeezed by the rolls 40 as it leaves the container in order to remove as much solvent as possible. The used string is coiled in the container 50. This string may be reused after removal of all of the organic phase and wash solvent, and then be allowed to again take up the necessary moisture. In that case it will be returned through the pinch rolls 11 to make the process continuous. The two ends of the string may be united.

Instead of pinch rolls 11, other means may be used for removing the liquid from the string, for example a small hole through which the string passes, or a knife blade around which it passes, etc.

Instead of pulleys wide rollers may be used. The pinch rolls 11 may be wide. A very long string may then be used and recycled through the process repeatedly. On each return the string will then lie closely adjacent to the string employed in the previous cycle. The string will then gradually progress from one end of the equipment to the other. It may be discarded after the final cycle, or be thoroughly cleansed and reused.

Instead of the string described in the foregoing description, cotton cloth composed of multitudinous strings of larger or smaller diameter may be employed. This permits the handling of much more aqueous phase which therefore results in more pounds per hour of product than would be possible with a single string.

Figure 2:
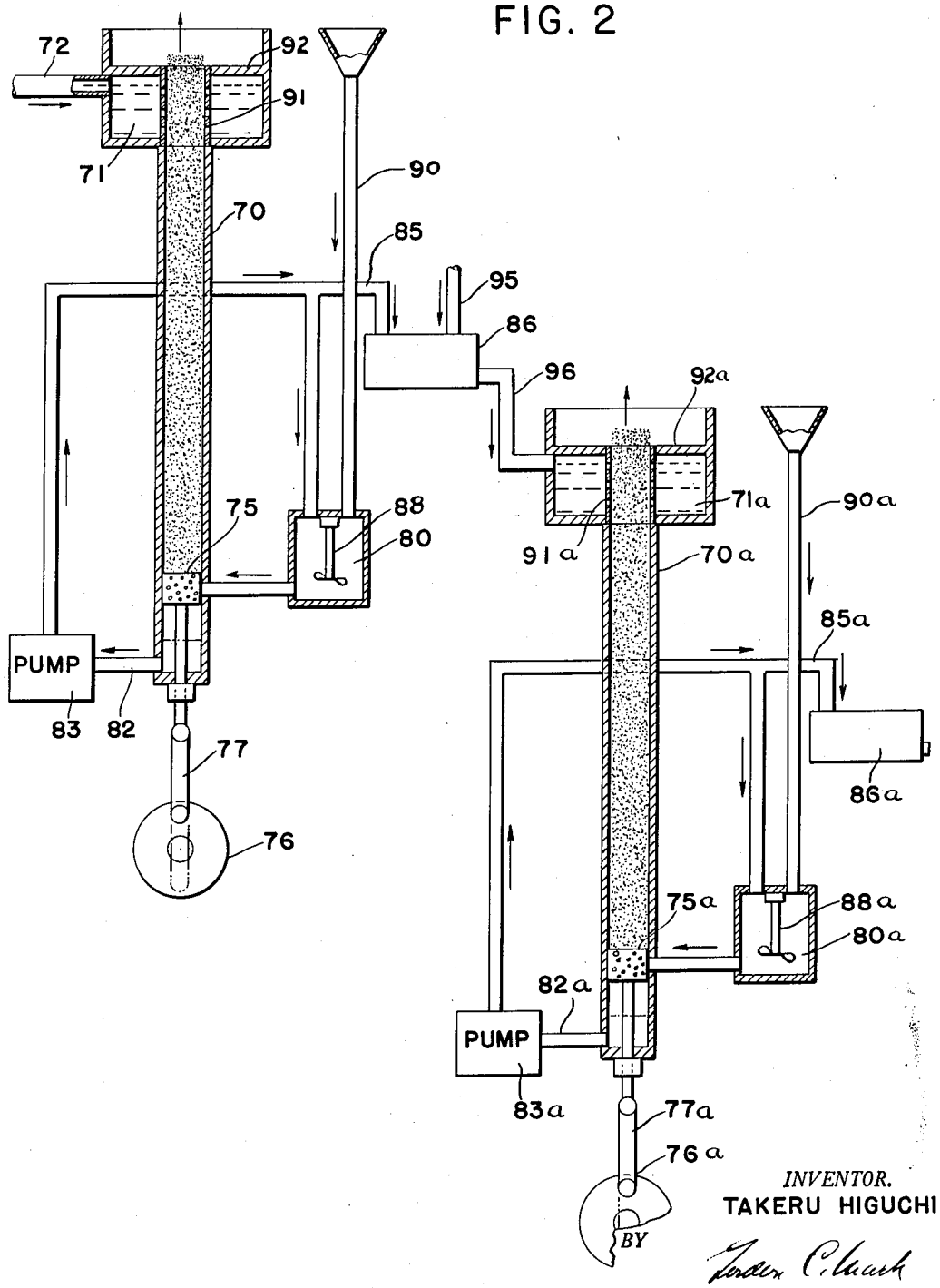
Fig. 2 shows other laboratory equipment for carrying out the process.

Figure 2 illustrates laboratory equipment in which 70 is a column about eighteen millimeters internal diameter and approximately twenty-five centimeters long. It broadens at the top to provide a container 71 with an inlet 72 for eluant. The bed of particulate adsorbent is originally provided by packing the cylinder relatively uniformly. The packing material is made up by mixing 250 grams of silicic acid (chromatographic grade) with 250 milliliters of one molar citrate buffer having a pH of 5.20. This buffer is prepared by adding one molar citric acid solution to one molar sodium citrate until the desired hydrogen ion concentration was obtained. After thoroughly mixing the silicic acid with the water the mixture is suspended in sufficient organic solvent composed of 5 per cent n-butanol and 95 per cent chloroform to provide a relatively thin suspension. A sufficient amount of this is poured into the column and packed to produce a homogeneous bed of the adsorbent which entirely fills the column above the sintered glass porous plunger 75. This plunger is reciprocated by the wheel 76 through the arm 77. In each upward stroke the bed is moved upward and fresh suspension for forming the bed is supplied from the reservoir 80. The eluate which filters through the plunger is drawn off through the opening 82 and lifted by the pump 83 to be returned to the reservoir 80. The overflow is carried through the tube 85 into the mixing vessel 86.

The reservoir 80 is equipped with an agitator 88 which is suitably driven and adsorbent material which has been recovered from the cylinder 70a is fed down through the tube 90 at a uniform rate. This adsorbent is dispersed in the reservoir 80 and on the downstroke of the plunger 75 flows into the cylinder and on the upstroke is packed up into the cylinder. The eluant flows through the sintered plunger and is recirculated by the pump.

The adsorbent bed is packed sufficiently tight so that when it reaches the top of the column 70 it will remain intact and pass up through the porous shield 91 in the cover 92 which prevents adsorbent which rises up through the shield 91 from falling back into the reservoir 71 and mixing with the eluant there. The used adsorbent is removed from the top of the column and treated for the recovery of the more polar of the materials which are to be separated. Thus, if the apparatus is used for the separation of azelaic and sebacic acids, the azelaic acid will be recovered from the adsorbent. The rate at which the adsorbent bed is moving upward can be measured in any desired manner. Thus, a plunger or the like may rest on the top of the adsorbent column as it is rising and be removed from time to time as adsorbent is removed from the column and then be replaced.

The feed of azelaic and sebacic acids is introduced through the opening 95. This may be in the form of a solution or, if the mixture is crystalline eluate from the column 70 will be used to dissolve it in the tank 86. For this purpose the tank will be provided with an agitator. The organic phase (which includes the eluate from the column 70 and such solvent as is added with the feed) is withdrawn from the reservoir 86 through the tube 96 into the reservoir 71a at the top of column 70a. This column is identical with the column 70 and is provided at the bottom with a plunger, etc. as previously described. Fresh adsorbent, which may be merely the mixture of silicic acid and aqueous phase, or may also include solvent, is introduced through the tube 90a, and in the reservoir 80a is suspended in sufficient of the eluate from the column 70a to cause it to move into the bottom of the cylinder 70a on the downstroke of the plunger 75a. The adsorbent removed from the top of the column 70a is fed into the top of the tube 90 and used in the column 70. Any suitable means for transferring the adsorbent from the one column to the other may be employed.

This system thus provides for continuous movement of the adsorbent bed up through the column 70a and then up through the column 70. The eluant is fed through the pipe 72 and flows countercurrent to the adsorbent bed, first through the column 70 and then through the column 70a. It is drawn off at the bottom of the column 70a into the reservoir 86a. It includes all of the sebacic acid and none of the azelaic acid. The adsorbent removed from the top of the column 70 includes all of the azelaic acid and none of the sebacic acid. For such separation the eluant introduced through the pipe 72 may be 5 per cent n-butanol and 95 per cent chloroform by volume.

If the adsorbent bed in the two columns are moved upwardly at the rate of 20 centimeters per hour and the eluant flows down through the columns at the rate of 30 milliliters per hour (it being understood that the flow through column 70a will be somewhat greater than the flow through the column 70 if additional solvent is added with the feed) the system will effect complete separation of sebacic and azelaic acids, the optimum relative flow rates of the organic phase and the adsorbent beds depending upon the nature of the adsorbent, the tightness of the packing, etc. For the separation of other materials other solvents will be used, etc.

It will be understood that the equipment shown in Fig. 2 is illustrative only, and may be modified as desired. Thus, in the reservoir 71 at the top of column 70 the bed of adsorbent may be made to rise through any adsorbent shield which will permit the inflow of eluant. Since higher temperature of operation of the column will permit higher concentration of the solutes, it will be necessary to substitute higher boiling solvents, such as 1,2,3-trichloroprene, o-dichlorobenzene, etc. for chloroform which was employed in the above example.

Figure 3 is in the nature of a flow sheet, and illustrates diagrammatically means for separating two materials supplied at the "Feed" in solution in a suitable organic solvent. Particulate adsorbent is suitably conveyed through the system, care being taken to maintain, insofar as is practical, the relative relations of the particles of adsorbent to one another. The movement of the bed is continuous. Eluant is supplied continuously and flows countercurrent to the movement of the bed. Suitable means is provided for removing eluate from the other end of the bed, preferably entirely free from adsorbent. If the feed contains a mixture of meta and para cresols or a mixture of phenol and resorcinol, for example, the more polar dissolves into the aqueous phase and is removed with the adsorbent; the less polar dissolves into the organic phase and is removed in the eluate. The phenols are then recovered by suitable means.

The flow sheet of Fig. 4 resembles, to some extent, the flow sheet of Fig. 3 except that the adsorbent moves down through the column and the eluant moves up. Any suitable means for carrying out such an operation may be employed.

Figure 5 is a flow sheet which diagrammatically shows how the process illustrated in Fig. 2 may be carried on commercially. The adsorbent enters the bottom of the bottom column and when it reaches the top of that column it is introduced into the bottom of the top column and is eventually removed from the top of the top column. The eluant flows countercurrent to the adsorbent and is introduced into the top of the top column and the final eluate is removed from the bottom of the bottom column. The eluate from the top column is drawn off into a mixer. Here it is thoroughly mixed with the feed material, whether this material be a liquid, gas or solid. The feed may be supplied to the mixer in the form of a solution. From the mixer the organic phase enters the top of the bottom column and final eluate is drawn out of the bottom of this column.

Although Fig. 5 illustrates one column above the other, the arrangement of the equipment is not material. The two columns may be side-by-side, or arranged in any desired manner.

Regardless of the mechanical features of the process employed or the nature of the materials used, the more polar of the separated materials will be separated from the adsorbent and after suitable processing the adsorbent may be reused. For example, the spent adsorbent together with the adsorbed more polar component can be passed countercurrent-wise through a system analogous to ones described above against the flow of an eluant sufficiently polar to elute off the adsorbed component, that is the component dissolved in the aqueous phase. This eluant is immiscible with the aqueous phase adhering to the spent adsorbent. For example, in the case of the separation of azelaic and sebacic acids, cited above, the sebacic acid can be removed from the spent bed material by moving the bed countercurrently against a solution composed of 10 per cent n-butanol and 90 per cent chloroform in apparatus such as illustrated and described. The eluate from the system will contain all of the sebacic acid. The issuing adsorbent can be reused in the original system after washing with fresh mixture of 5 per cent n-butanol and 95 per cent chloroform or sufficient chloroform containing no n-butanol to return the remaining organic phase to the desired 5 per cent n-butanol and 95 per cent chloroform.

Unless the organic phase is brought into equilibrium with the buffer phase before being brought into contact with the aqueous phase, with regards to their water contents, the organic phase will tend to extract water from the aqueous phase adhering to the bed particles. For this reason it is advantageous to add small amounts of the buffer to the tanks in which the organic phase materials are stored.

What I claim is:

1. The continuous process of separating two materials, one of which is more polar than the other, in a two-phase liquid system, the phases being immiscible with one another, utilizing the partition coefficients of the two materials, the partition coefficients of the two materials being different, which process comprises using a bed of adsorbent to which one of the phases and only one of the phases adheres, and moving the bed continuously countercurrently to eluant which forms the other phase and is drawn off as eluate, introducing the two materials into the system as a liquid intermediate the location of the introduction of the eluant and the location of the removal of the eluate and a substantial distance from each of said locations, dissolving one of the materials into the phase which adheres to the adsorbent while maintaining countercurrent flow between the two phases and withdrawing the other material from the system dissolved in the eluate, and keeping the two phases in contact with one another between the location of the introduction of the two materials and the locations of withdrawal of the adsorbent and eluate while moving them countercurrently for a sufficient distance on both sides of the location at which the two materials are introduced into the system to effect substantially complete separation of the materials by solution in the respective phases.

2. The continuous process of separating two materials, one of which is more polar than the other, in a two-phase liquid system, one of the phases being aqueous and the other organic, utilizing the partition coefficients of the two materials, said coefficients of the two materials being different, which process comprises moving the organic phase continuously countercurrently to a bed of adsorbent to which the aqueous phase adheres, continuously introducing organic eluant and withdrawing it as organic phase eluate, introducing the two materials in liquid form into the moving organic phase intermediate the location of the introduction of the eluant and removal of eluate and a substantial distance from each, and maintaining countercurrent flow between the two phases between said location of the introduction of the two materials and said location of introduction of eluant and removal of eluate and on both sides of the location at which the two materials are introduced into the organic phase and thereby effecting substantially complete separation of the two materials (1) by solution of the more polar in the aqueous phase and continuously withdrawing it from the system adhered to the adsorbent bed, and (2) by solution of the less polar in the organic phase and continuously withdrawing it from the system as eluate.

3. The continuous process of separating two materials, one of which is more polar than the other, in a two-phase liquid system, one of the phases being aqueous and the other organic, utilizing the partition coefficients of the two materials, which process comprises moving the organic phase continuously countercurrently to a bed of adsorbent to which the aqueous phase adheres, continuously introducing organic eluant and withdrawing it as organic phase eluate, continuously withdrawing organic phase from the system at a location intermediate the location of the introduction of the eluant and the location of the final withdrawal of organic phase eluate and a substantial distance from each of said locations, dissolving the two materials in the withdrawn organic phase and continuously introducing the resulting solution into the system at substantially the said location at which eluant was withdrawn, and moving the two phases in countercurrent contact between the location of introduction of the materials into the systems and the locations of introduction of eluant and final removal of eluate for a sufficient period to effect substantially complete separation of the two materials (1) by solution of the more polar into the aqueous phase and continuously withdrawing it from the system adhering to the adsorbent, and (2) by solution of the less polar of the materials in the organic phase and continuously withdrawing it from the system in the organic phase eluate.

References Cited in the file of this patent

UNITED STATES PATENTS

| | | |
|---|---|---|
| 2,470,339 | Claussen et al. | May 17, 1949 |
| 2,552,436 | Bennett et al. | May 8, 1951 |

FOREIGN PATENTS

| | | |
|---|---|---|
| 558,320 | Great Britain | Dec. 31, 1943 |
| 585,224 | Great Britain | Feb. 3, 1947 |

OTHER REFERENCES

Davison Chem. Corp., "Chromatographic Adsorption and Silica Gel," copyright 1946, pp. 2–4, Baltimore 3, Maryland.

Marvel et al.: J. Am. Chem. Soc., vol. 72, pp. 2642–6, 1950.